(12) United States Patent
Fujimoto et al.

(10) Patent No.: US 12,148,883 B2
(45) Date of Patent: Nov. 19, 2024

(54) LITHIUM SECONDARY BATTERY

(71) Applicant: Panasonic Intellectual Property Management Co., Ltd., Osaka (JP)

(72) Inventors: Masahisa Fujimoto, Osaka (JP); Shuji Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 757 days.

(21) Appl. No.: 16/935,205

(22) Filed: Jul. 22, 2020

(65) Prior Publication Data
US 2020/0350629 A1 Nov. 5, 2020

Related U.S. Application Data

(63) Continuation of application No. PCT/JP2019/017412, filed on Apr. 24, 2019.

(30) Foreign Application Priority Data

May 30, 2018 (JP) ................................. 2018-103971

(51) Int. Cl.
*H01M 10/05* (2010.01)
*H01M 4/40* (2006.01)
(Continued)

(52) U.S. Cl.
CPC ....... *H01M 10/0567* (2013.01); *H01M 4/405* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| 7,141,187 B2 | 11/2006 | Kosuzu et al. |
| 2005/0100782 A1 | 5/2005 | Iijima et al. |

(Continued)

FOREIGN PATENT DOCUMENTS

| CN | 106159322 A | 11/2016 |
| JP | 2003-257496 | 9/2003 |

(Continued)

OTHER PUBLICATIONS

International Search Report of PCT application No. PCT/JP2019/017412 dated Aug. 6, 2019.

(Continued)

*Primary Examiner* — Maria Laios
*Assistant Examiner* — Angela J Martin
(74) *Attorney, Agent, or Firm* — Rimon P.C.

(57) ABSTRACT

The lithium secondary battery of the present invention satisfies at least one requirement selected from the group consisting of requirements (i) and (ii). (i) An electrolyte liquid includes an anode mediator which is dissolved along with lithium in a solvent of the electrolyte liquid to give, to the electrolyte liquid, an equilibrium potential which is not more than an upper limit potential at which a compound of lithium and an anode active material is formed, and does not include a compound which is dissolved along with lithium in the solvent of the electrolyte liquid to give, to the electrolyte liquid, an equilibrium potential which is more than the upper limit potential. (ii) The electrolyte liquid only includes, as the anode mediator, only a compound which is dissolved along with lithium in the solvent of the electrolyte liquid to give, to the electrolyte liquid, the equilibrium potential which is not more than the upper limit potential at which the compound of lithium and the anode active material is formed.

15 Claims, 6 Drawing Sheets

(51) Int. Cl.
     *H01M 10/0525*    (2010.01)
     *H01M 10/0567*    (2010.01)
     *H01M 4/02*    (2006.01)

(56) References Cited

U.S. PATENT DOCUMENTS

| | | | |
|---|---|---|---|
| 2015/0229005 A1* | 8/2015 | Han | H01M 10/0568 |
| | | | 429/200 |
| 2015/0255803 A1 | 9/2015 | Delnick et al. | |
| 2016/0056490 A1* | 2/2016 | Chiang | H01M 4/62 |
| | | | 429/104 |
| 2019/0058208 A1 | 2/2019 | Fujimoto et al. | |

FOREIGN PATENT DOCUMENTS

| | | |
|---|---|---|
| JP | 3733065 | 1/2006 |
| JP | 4898737 | 3/2012 |
| JP | 2015-032447 | 2/2015 |
| JP | 2016-139457 | 8/2016 |
| JP | 2016-207557 | 12/2016 |
| JP | 2017-183182 | 10/2017 |
| WO | 2018/016249 | 1/2018 |

OTHER PUBLICATIONS

Extended European Search Report dated Jun. 23, 2021 for the related European Patent Application No. 19811321.9.
English Translation of Chinese Search Report dated Dec. 18, 2023 for the related Chinese Patent Application No. 201980013318.4.

* cited by examiner

Al Foil

Alloyed with Li

LITHIUM SECONDARY BATTERY

BACKGROUND

1. Technical Field

The present disclosure relates to a lithium secondary battery.

2. Description of the Related Art

A characteristic of the lithium secondary battery is varied, depending on the kind of an active material thereof. For example, a lithium metal is used as an anode active material to provide a lithium secondary battery having a high energy density. However, if the lithium metal is used as the anode active material, the lithium metal may be precipitated in a dendrite shape during charge of the lithium secondary battery, which may cause an internal short circuit. Since the precipitated lithium metal is generated in a form of atomic groups, the precipitated lithium metal is very active. The precipitated lithium metal reacts with an electrolyte solvent, and a part of the precipitated lithium metal is turned into an inactive organolithium compound. This raises a problem that charge/discharge efficiency is made low. Various kinds of solvents have been studied in order to suppress reactivity with the solvent, however, a significantly excellent solvent has not been found.

On the other hand, if graphite is used as the anode active material, the lithium metal can be prevented from being precipitated in the dendrite shape during the charge. A reaction in which lithium ions are inserted between the graphite layers and a reaction in which lithium ions are desorbed from the graphite layers are topotactic reactions and are excellent in reversibility. For these advantages, a lithium secondary battery using graphite as the anode active material have been put into practical use.

However, the lithium ion insertion reaction between the graphite layers is greatly affected by the electrolyte solvent. For the lithium secondary battery, a carbonate is used as the solvent because of its wide potential window (reduction resistance, oxidation resistance), its viscosity, and its ionic conductivity in a case where the lithium salt has been dissolved. However, if a cyclic carbonate (e.g., propylene carbonate or butylene carbonate) in which one of hydrogen atoms has been substituted with an alkyl group is used, the solvent is decomposed and lithium ions are not inserted. On the other hand, lithium ions can be inserted, if an unsubstituted ethylene carbonate, a chloroethylene carbonate, a fluoroethylene carbonate or a chain carbonate which has been substituted with halogen is used.

CITATION LIST

Patent Literature

Patent Literature 1: Japanese Patent Publication No. 4898737
Patent Literature 2: Japanese Patent Publication No. 3733065

SUMMARY

The theoretical capacity density of a lithium metal is 3,884 mAh/g. On the other hand, the theoretical capacity density of graphite is 372 mAh/g, which is approximately 1/10 of the theoretical capacity density of the lithium metal. The capacity density of graphite in an actual lithium secondary battery is also close to the theoretical capacity density, and it is difficult to further increase the capacity of the lithium secondary battery using graphite as the anode active material.

As an anode active material replacing graphite, a material capable of forming an alloy with lithium is attracting attention. Aluminum, silicon, and tin are known as the material capable of forming an alloy with lithium. The theoretical capacity density of these materials is much greater than the theoretical capacity density of graphite. However, a lithium secondary battery using these materials has a problem of low charge/discharge reversibility.

The present disclosure provides a lithium secondary battery which uses a material capable of forming an alloy with lithium and has excellent reversibility.

The present disclosure provides a lithium secondary battery comprising:

a cathode;

an anode including an anode current collector and an anode active material;

a separator disposed between the cathode and the anode; and an electrolyte liquid in contact with the cathode and the anode, wherein the cathode includes a cathode current collector and a cathode active material layer disposed on the cathode current collector;

the anode includes a material capable of forming an alloy with lithium during charge;

the electrolyte liquid includes lithium ions and counter anions of the lithium ions;

the electrolyte liquid contains at least one selected from the group consisting of phenanthrene, biphenyl, triphenylene, acenaphthene, acenaphthylene, fluoranthene, and benzyl; and the electrolyte includes at least one selected from the group consisting of a cyclic ether, a glyme, and a sulfolane as the solvent thereof.

According to the present disclosure, a lithium secondary battery having excellent reversibility can be provided.

DETAILED DESCRIPTION OF THE EMBODIMENT

Figure 1:
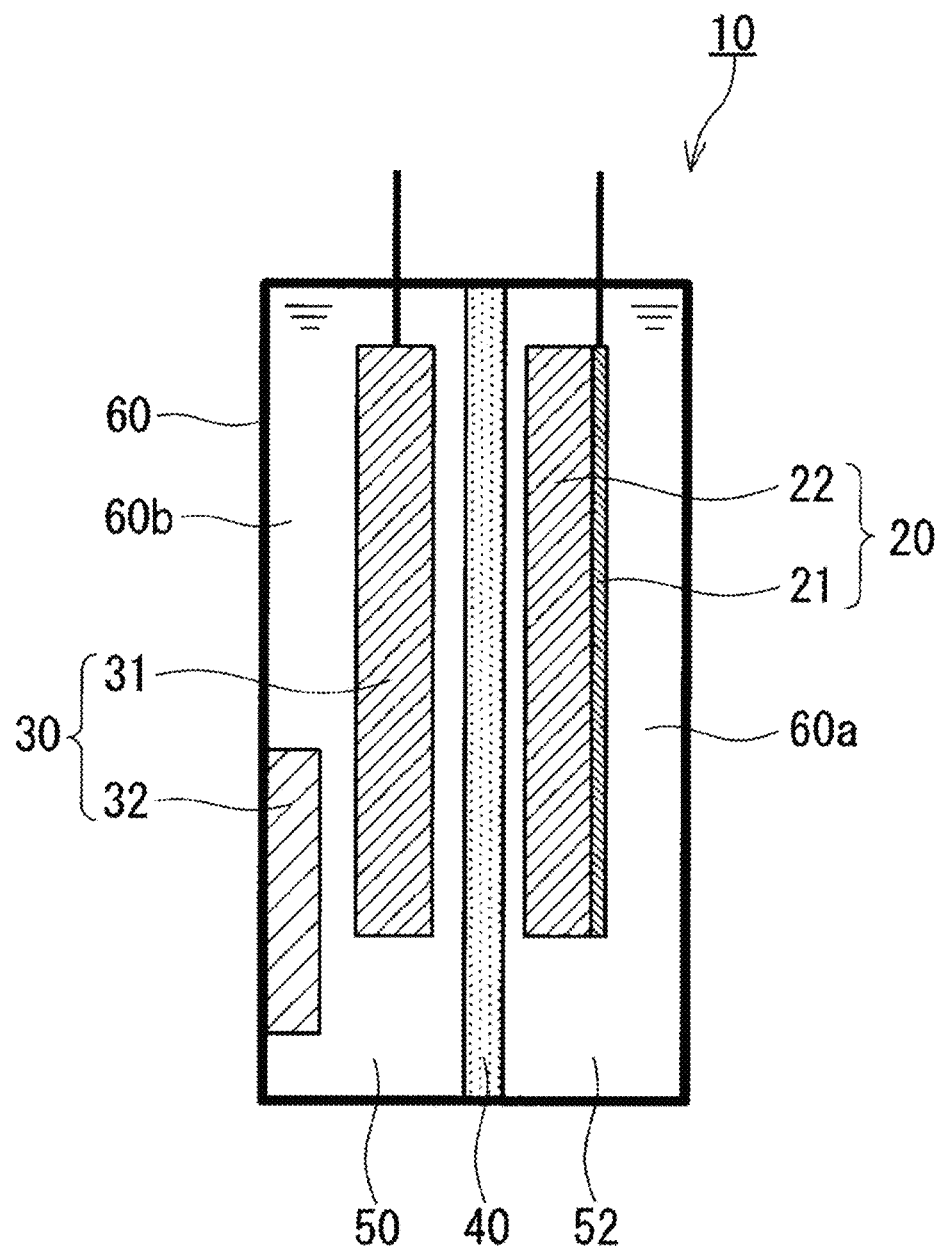
FIG. 1 is a schematic cross-sectional view of a lithium secondary battery according to an embodiment of the present disclosure.

Findings which Established the Foundation of the Present Disclosure

If a material such as aluminum, silicon, or tin is used as an anode active material of a lithium secondary battery, these materials electrochemically form an alloy with lithium during charge. In the present specification, these materials capable of forming the alloy with lithium may be referred to as "alloying materials".

An anode using the alloying material is expanded, when lithium is occluded. The anode using the alloying material is contracted, when the lithium is released. After the expansion and the contraction are repeated, the alloying material is pulverized and peeled off from an anode current collector. Even if the alloying material stays in the anode, electrical contact between the alloying material and the anode current collector failed to be provided, and charge/discharge is made difficult. In other words, at the time when the battery is expanded during the charge, almost all parts of the active material are separated from the current collector, and discharge can be hardly performed. This phenomenon is a main reason for poor reversibility of the lithium secondary battery using the alloying material.

Since this phenomenon has nothing to do with an electrolyte solvent, reversibility is not improved, even if a solvent species is changed.

The present inventors have intensively studied a technique for overcoming the above-described problem caused by a charge/discharge mechanism of the alloying material. As a result, the present inventors have made an invention of the following lithium secondary battery of the present disclosure.

Outline of One Aspect According to Present Disclosure

The lithium secondary battery according to one aspect of the present disclosure has the following configuration.

The lithium secondary battery according to one aspect of the present disclosure comprises:
a cathode;
an anode including an anode current collector and an anode active material;
a separator disposed between the cathode and the anode; and
an electrolyte liquid in contact with the cathode and the anode,
wherein
the cathode includes a cathode current collector and a cathode active material layer disposed on the cathode current collector;
the anode includes a material capable of forming an alloy with lithium during charge;
the electrolyte liquid includes lithium ions and counter anions of the lithium ions;
the electrolyte liquid contains at least one selected from the group consisting of phenanthrene, biphenyl, triphenylene, acenaphthene, acenaphthylene, fluoranthene, and benzyl; and the electrolyte includes at least one selected from the group consisting of a cyclic ether, a glyme, and a sulfolane as the solvent thereof.

According to the above aspect, even if the anode active material is pulverized, charge and discharge of the lithium secondary battery is reliably performed through at least one selected from the group consisting of phenanthrene, biphenyl, triphenylene, acenaphthene, acenaphthylene, fluoranthene, and benzyl. For example, a lithium secondary battery which uses a high-capacity alloying material as the anode active material, has a high energy density, and has excellent reversibility can be provided.

The cyclic ether may include at least one selected from the group consisting of 2-methyltetrahydrofuran, tetrahydrofuran, 1,3-dioxolane and 4-methyl-1,3-dioxolane. Thereby, a lithium secondary battery having the excellent reversibility can be provided.

The glyme may include at least one selected from the group consisting of monoglyme, diglyme, triglyme, tetraglyme and polyethylene glycol dimethyl ether. Thereby, the lithium secondary battery having the excellent reversibility can be provided.

The sulfolane may include 3-methyl sulfolane. Thereby, the lithium secondary battery having the excellent reversibility can be provided.

The anode active material may include Al. A LiAl alloy may be generated during the charge. The composition of the LiAl alloy may be at least one selected from the group consisting of LiAl, $Li_2Al_3$, and $Li_4Al_5$.

The anode active material may include Zn. A LiZn alloy may be generated during the charge. The composition of the LiZn alloy may be at least one selected from the group consisting of $Li_2Zn_3$, $LiZn_2$, $Li_2Zn_5$, $LiZn_4$, and LiZn.

The anode active material may include Si. A LiSi alloy may be generated during the charge. The composition of the LiSi alloy may be at least one selected from the group consisting of $Li_{22}Si_5$, $Li_{13}Si_4$, $Li_7Si_3$, and $Li_{12}Si_7$.

The anode active material may include Sn. A LiSn alloy may be generated during the charge. The composition of the LiSn alloy may be at least one selected from the group consisting of $Li_{22}Sn_5$, $Li_7Sn_2$, $Li_{13}Sn_5$, $Li_7Sn_3$, $Li_5Sn_2$, LiSn, and $Li_2Sn_5$.

The anode active material may include Ge. A LiGe alloy may be generated during the charge. The composition of the LiGe alloy may be at least one selected from the group consisting of $Li_5Ge_{22}$ and $Li_3Ge$.

The anode active material may include Cd. A LiCd alloy may be generated during the charge. The composition of the LiCd alloy may be at least one selected from the group consisting of $LiCd_3$ and $Li_3Cd$.

The anode active material may include Bi. A LiBi alloy may be generated during the charge. The composition of the LiBi alloy may be at least one selected from the group consisting of LiBi and $Li_3Bi$.

According to the above aspect, a lithium secondary battery having a high energy density can be provided.

The separator may include at least one selected from the group consisting of a solid electrolyte, a gel electrolyte, an ion exchange resin membrane, a semipermeable membrane, and a porous membrane. Thereby, the safety of the lithium secondary battery can be secured sufficiently.

The anode active material may be disposed away from the anode current collector. This increases a degree of freedom in designing shapes and dimensions of the anode current collector and the anode active material.

Hereinafter, an embodiment of the present disclosure will be described with reference to the drawings. The present disclosure is not limited to the following embodiment.

EMBODIMENT

FIG. 1 shows a cross-sectional view of a lithium secondary battery according to the embodiment of the present disclosure. The lithium secondary battery 10 comprises a cathode 20, an anode 30, a separator 40, and a first electrolyte liquid 50. The separator 40 is disposed between the cathode 20 and the anode 30. The first electrolyte liquid 50 includes a solvent and an anode mediator, and is in contact with the anode 30. The anode mediator is dissolved in a solvent of the first electrolyte liquid 50. The anode 30 includes an anode current collector 31 and an anode active material 32. The redox reaction of the anode active material 32 in the anode 30 proceeds through the anode mediator.

Even if the anode active material 32 is pulverized, the lithium secondary battery 10 can be reliably charged and discharged through the anode mediator. For example, the lithium secondary battery 10 which uses a high-capacity alloying material as the anode active material 32 and has a high energy density and an excellent cycle characteristic can be provided.

By using an active material having a relatively low equilibrium potential (vs. $Li/Li^+$) as the anode active material 32, a material having a relatively low equilibrium potential (vs. $Li/Li^+$) can be used as the anode mediator. The active material having the relatively low equilibrium potential as the anode active material 32 is, for example, aluminum. The material having the relatively low equilibrium potential as the anode mediator is, for example, a condensed aromatic compound. Thereby, the anode 30 of the lithium secondary battery 10 having a lower potential can be realized. As a result, the lithium secondary battery 10 having a high battery voltage can be realized.

The compound of lithium and the anode active material 32 may be an alloy or a graphite intercalation compound such as $C_6Li$.

In the lithium secondary battery 10 of the present embodiment, lithium may be dissolved in the first electrolyte liquid 50.

The anode active material 32 may be a material having a property of occluding and releasing lithium.

During the charge of the lithium secondary battery 10, the anode mediator is reduced on the surface of the anode current collector 31. The reduced anode mediator is oxidized by the anode active material 32. The anode active material 32 occludes lithium.

During discharge of the lithium secondary battery 10, the anode active material 32 which has occluded the lithium reduces the anode mediator and releases the lithium. The reduced anode mediator is oxidized on the surface of the anode current collector 31.

The anode active material 32 has, for example, a property of reversibly occluding and releasing lithium and/or lithium ions. Thereby, material design of the anode active material 32 becomes easier. Moreover, higher capacity can be realized.

During the charge of the lithium secondary battery 10 of the present embodiment, the anode mediator may be reduced on the surface of the anode current collector 31.

During the discharge of the lithium secondary battery 10 of the present embodiment, the anode mediator may be oxidized on the surface of the anode current collector 31.

The lithium secondary battery 10 of the present embodiment can realize a higher energy density and a higher capacity. In other words, by reducing the anode mediator by the anode current collector 31 during the charge, an amount of the anode mediator which is oxidized by the anode current collector 31 during the discharge can be increased. Furthermore, by oxidizing the anode mediator by the anode current collector 31 during the discharge, an amount of the anode mediator which is reduced by the anode current collector 31 during the charge can be increased. Thereby, the capacity of the charge/discharge can be increased.

For example, when the first electrolyte liquid 50 is brought into contact with the anode current collector 31, the anode mediator is oxidized or reduced by the anode current collector 31.

For example, when the first electrolyte liquid 50 is brought into contact with the anode active material 32, a reduction reaction of the anode mediator by the anode active material 32 occurs, or an oxidation reaction of the anode mediator by the anode active material 32 occurs.

The anode mediator is not particularly limited, as long as the anode mediator is a compound which is dissolved in the solvent of the first electrolyte liquid 50 along with lithium to give, to the first electrolyte liquid 50, an equilibrium potential which is equal to or lower than the upper limit potential at which a compound of lithium and the anode active material 32 is formed. The anode mediator may be a condensed aromatic compound.

The first electrolyte liquid 50 in which the condensed aromatic compound has been dissolved has a property of releasing solvated electrons of lithium and dissolving the lithium as cations. In other words, the condensed aromatic compound has a property of receiving, as solvated electrons, electrons emitted when lithium is dissolved in the solvent of the first electrolyte liquid 50 and dissolving in the solvent of the first electrolyte liquid 50.

The lithium secondary battery 10 of the present embodiment can realize an anode mediator having a property of low potential. The solution including the condensed aromatic compound has an ability to dissolve lithium. The solution including the condensed aromatic compound may be, for example, an ether solution. Lithium tends to release electrons to be cations. As a result, lithium gives the electrons to the condensed aromatic compound in the solution to be cations, and is dissolved in the solution. At this time, the condensed aromatic compound which has received the electrons solvates with the electrons. By solvating with electrons, the condensed aromatic compound behaves as an anion. As a result, the solution itself including the condensed aromatic compound has ionic conductivity. Here, equivalent amounts of Li cations and electrons are present in the solution including the condensed aromatic compound. As a result, the solution itself including the condensed aromatic compound has a highly reduction property, in other words, a property of low potential.

For example, an electrode which is chemically inactive with regard to lithium is immersed in the solvent of the first electrolyte liquid 50 in which the condensed aromatic compound has been dissolved, and the potential of the electrode with respect to lithium metal is measured. In this case, a considerably low potential is observed. The observed potential is determined by a degree of the solvation of the condensed aromatic compound and the electrons, namely, the kind of the condensed aromatic compound.

The configuration of the lithium secondary battery 10 will be described in detail.

The lithium secondary battery 10 comprises a container 60. The container 60 is sealed. The container 60 is formed of a material having an insulating property and corrosion resistance. The cathode 20, the anode 30, the separator 40, and the first electrolyte liquid 50 are disposed in the container 60. The inside of the container 60 is divided into two regions 60a and 60b by the separator 40. The cathode 20 is disposed in one region 60a of the two regions 60a and 60b, and the anode 30 is disposed in the other region 60b.

The cathode 20 includes a cathode current collector 21 and a cathode active material layer 22. The cathode active material layer 22 is disposed on the cathode current collector 21. The cathode current collector 21 and the cathode active material layer 22 are in electrical contact.

The cathode current collector 21 is formed of, for example, a material having electronic conductivity such as stainless steel, copper, nickel, or carbon. A shape of the cathode current collector 21 is not particularly limited, and is, for example, a plate shape.

The cathode active material layer 22 is a layer including a cathode active material. The cathode active material may be a material having a property of reversibly occluding and releasing lithium ions. Examples of the cathode active material include a transition metal oxide, a fluoride, a polyanion, a fluorinated polyanion, a transition metal sulfide, and a phosphorus oxide having an olivine structure. Examples of the transition metal oxide include $LiCoO_2$, $LiNiO_2$, and $Li_2Mn_2O_4$. Examples of the phosphorus oxide include $LiFePO_4$, $LiNiPO_4$, and $LiCoPO_4$. The cathode active material layer 22 may include a plurality of kinds of the cathode active materials. If the cathode active material layer 22 includes lithium in advance, the anode active material 32 does not have to include lithium. If the cathode active material 22 does not include lithium, the anode active material 32 includes lithium in advance.

The cathode active material layer 22 may include an additive such as a conductive agent, an ion conduction assistant agent, or a binder, as necessary.

The cathode 20 may be formed of a lithium metal. If the lithium metal is used as the cathode 20, it is easy to control dissolution and precipitation as a metal cathode, and a high capacity can be realized.

The anode 30 includes the anode current collector 31 and the anode active material 32. Both the anode current collector 31 and the anode active material 32 are immersed in the first electrolyte liquid 50. In the present embodiment, the anode active material 32 is disposed away from the anode current collector 31. According to such a configuration, the degree of freedom in designing the shapes and the dimensions of the anode current collector 31 and the anode active material 32 is increased. The first electrolyte liquid 50 including an anode mediator is present between the anode current collector 31 and the anode active material 32. In other words, the anode active material 32 is not in direct contact with the anode current collector 31, however, the anode active material 32 may be in contact with the anode current collector 31.

The anode current collector 31 has a surface that acts as a reaction field for the anode mediator. A material which is stable with respect to the first electrolyte liquid 50 can be used as the anode current collector 31. Furthermore, a material which is stable against an electrochemical reaction which is an electrode reaction can be used as the anode current collector 31. For example, a material having electronic conductivity such as a metal or carbon can be used as the anode current collector 31. Examples of the metal include stainless steel, iron, copper, and nickel.

The anode current collector 31 may have a structure having an increased surface area thereof. Examples of the structure having the increased surface area may be a mesh, a nonwoven fabric, a surface-roughened plate, and a sintered porous body. If the anode current collector 31 has such a structure, the oxidation reaction or the reduction reaction of the anode mediator proceeds easily.

The anode active material 32 includes, for example, a material capable of forming an alloy with lithium during the charge. By using the alloying material described below, the lithium secondary battery 10 having a high energy density is provided.

The anode active material 32 may include Al. In this case, a LiAl alloy is generated during the charge of the lithium secondary battery 10. The composition of the LiAl alloy may be at least one selected from the group consisting of LiAl, $Li_2Al_3$, and $Li_4Al_5$.

The anode active material 32 may include Zn. In this case, a LiZn alloy is generated during the charge of the lithium secondary battery 10. The composition of the LiZn alloy may be at least one selected from the group consisting of $Li_2Zn_3$, $LiZn_2$, $Li_2Zn_5$, $LiZn_4$, and LiZn.

The anode active material 32 may include Si. In this case, a LiSi alloy is generated during the charge of the lithium secondary battery 10. The composition of the LiSi alloy may be at least one selected from the group consisting of $Li_{22}Si_5$, $Li_{13}Si_4$, $Li_7Si_3$, and $Li_{12}Si_7$.

The anode active material 32 may include Sn. In this case, a LiSn alloy is generated during the charge of the lithium secondary battery 10. The composition of the LiSn alloy may be at least one selected from the group consisting of $Li_{22}Sn_5$, $Li_7Sn_2$, $Li_{13}Sn_5$, $Li_7Sn_3$, $Li_5Sn_2$, LiSn, and $Li_2Sn_5$.

The anode active material 32 may include Ge. In this case, a LiGe alloy is generated during the charge of the lithium secondary battery 10. The composition of the LiGe alloy may be at least one selected from the group consisting of $Li_5Ge_{22}$ and $Li_3Ge$.

The anode active material 32 may include Cd. In this case, a LiCd alloy is generated during the charge of the lithium secondary battery 10. The composition of the LiCd alloy may be at least one selected from the group consisting of $LiCd_3$ and $Li_3Cd$.

The anode active material 32 may include Bi. In this case, a LiBi alloy is generated during the charge of the lithium secondary battery 10. The composition of the LiBi alloy may be at least one selected from the group consisting of LiBi and $Li_3Bi$.

The anode active material 32 may include at least one selected from the group consisting of Al, Zn, Si, Sn, Ge, Cd, and Bi. The anode active material 32 may include a carbon material such as graphite.

The shape of the anode active material 32 is not particularly limited. The anode active material 32 may be in a powder form or a pellet form. The anode active material 32 may be solidified with a binder. Examples of the binder include resins such as polyvinylidene fluoride, polypropylene, polyethylene, and polyimide.

The anode active material 32 may be a material which is insoluble in the first electrolyte liquid 50.

If the solvated electrons in the lithium metal solution are brought into contact with the cathode, a short circuit occurs. Therefore, it is necessary to prevent the short circuit. For this purpose, a separator having a function of not allowing solvated electrons to pass therethrough is required. However, lithium ions as charge carriers need to pass through the separator. The separator 40 electrically isolates the cathode 20 and the anode 30 from each other. The separator 40 has lithium ion conductivity. The separator 40 may be composed of at least one selected from the group consisting of a solid electrolyte, a gel electrolyte, an ion exchange resin membrane, a semipermeable membrane, and a porous membrane. If the separator 40 is formed of these materials, the safety of the lithium secondary battery 10 can be sufficiently secured. Examples of the solid electrolyte include a sulfide solid electrolyte such as $Li_2S$—$P_2S_5$, and an oxide solid electrolyte such as $Li_7La_3Zr_2O_{12}$ (LLZ). Examples of the gel electrolyte include a gel electrolyte including a fluorine resin such as PVdF. Examples of the ion exchange resin membrane include a cation exchange membrane and an anion exchange membrane. Examples of the porous membrane include a porous membrane formed of polyolefin resin, and a porous membrane formed of glass paper provided by weaving glass fibers into a nonwoven fabric.

In the present embodiment, the separator 40 has a property of prohibiting passage of the anode mediator included in the first electrolyte liquid 50. Thereby, exchange of electrons between the cathode 20 and the anode 30 through the anode mediator can be prevented.

The first electrolyte liquid 50 includes a solvent and the anode mediator. The first electrolyte liquid 50 fills the region 60b where the anode 30 has been disposed.

The first electrolyte liquid 50 may include an electrolyte salt. Examples of the electrolyte salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiClO_4$, and a lithium bisoxalate borate.

In the present embodiment, the lithium secondary battery 10 further comprises a second electrolyte liquid 52. The second electrolyte liquid 52 includes a solvent and an electrolyte salt. The second electrolyte liquid 52 fills the region 60a where the cathode 20 has been disposed. The cathode 20 is in contact with the second electrolyte liquid 52. The cathode 20a may be immersed in the second electrolyte liquid 52.

The composition of the second electrolyte liquid 52 is not particularly limited. It is not necessary that the second electrolyte liquid 52 includes a mediator. The composition of the second electrolyte liquid 52 may be the same as the composition of the first electrolyte liquid 50, except that no mediator is included. The material which can be used as the solvent of the first electrolyte liquid 50 can be used as the solvent of the second electrolyte liquid 52. The material which can be used as the electrolyte salt of the first electrolyte liquid 50 can be used as the electrolyte salt of the second electrolyte liquid 52.

The second electrolyte liquid 52 may be replaced with a solid electrolyte having lithium ion conductivity. Examples of the solid electrolyte having lithium ion conductivity include a sulfide solid electrolyte such as $Li_2S$—$P_2S_5$. If the second electrolyte liquid 52 is replaced with a solid electrolyte, the separator 40 may be omitted.

The solvent of the first electrolyte liquid 52 and the anode mediator will be described in detail.

For example, if the anode active material 32 includes aluminum, during the charge of the lithium secondary battery 10, the aluminum included in the anode active material 32 reacts with lithium and is reduced to be a LiAl alloy. Therefore, if a condensed aromatic compound which has potential which is equal to or lower than the upper limit potential at which the LiAl alloy is formed is used as the anode mediator, the mediator-type anode 30 can be configured. The upper limit potential at which the LiAl alloy is formed is, for example, 0.18 V vs. Li/Li$^+$. For example, the anode mediator is a compound which is dissolved in the solvent of the first electrolyte liquid 50 along with lithium to give, to the first electrolyte liquid 50, an equilibrium potential equal to or lower than 0.18 V vs. Li/Li$^+$.

For example, if the anode active material 32 includes tin, during the charge of the lithium secondary battery 10, the tin included in the anode active material 32 reacts with lithium and is reduced to a LiSn alloy. Therefore, if a condensed aromatic compound which has potential which is equal to or lower than the upper limit potential at which the LiSn alloy is formed is used as the anode mediator, the mediator-type anode 30 can be configured. The upper limit potential at which the LiSn alloy is formed is, for example, 0.25 V vs. Li/Li$^+$. For example, the anode mediator is a compound which is dissolved in the solvent of the first electrolyte liquid 50 along with lithium to give, to the first electrolyte liquid 50, an equilibrium potential equal to or lower than 0.25 V vs. Li/Li$^+$.

For example, if the anode active material 32 includes graphite, during the charge of the lithium secondary battery 10, the graphite included in the anode active material 32 reacts with lithium and is reduced to $C_6Li$. Therefore, if a condensed aromatic compound which has potential which is equal to or lower than the upper limit potential at which $C_6Li$ is formed is used as the anode mediator, the mediator-type anode 30 can be configured. The upper limit potential at which $C_6Li$ is formed is, for example, 0.15 V vs. Li/Li$^+$. For example, the anode mediator is a compound which is dissolved in the solvent of the first electrolyte liquid 50 along with lithium to give, to the first electrolyte liquid 50, an equilibrium potential equal to or lower than 0.15 V vs. Li/Li$^+$.

The above description regarding the aluminum, the tin and the graphite also applies to Zn, Si, Ge, Cd, Pb, Bi and Sb. The anode mediator can be appropriately selected according to the upper limit potential at which LiZn, LiSi, LiGe, LiCd, LiPb, LiBi, and LiSb are formed.

Examples of the condensed aromatic compound which has a low potential include phenanthrene, biphenyl, o-terphenyl, triphenylene, acenaphthene, acenaphthylene, fluoranthene, 2,2'-bipyridyl, trans-stilbene, 2,4'-bipyridyl, 2,3'-bipyridyl, cis-stilbene, propiophenone, butyrophenone, valerophenone, ethylenediamine, benzyl, and tetraphenylcyclopentadienone.

Examples of the condensed aromatic compound which has a sufficiently low potential include phenanthrene, biphenyl, o-terphenyl, triphenylene, acenaphthene, acenaphthylene, fluoranthene, and benzyl. In other words, the anode mediator includes at least one selected from the group consisting of phenanthrene, biphenyl, o-terphenyl, triphenylene, acenaphthene, acenaphthylene, fluoranthene, and benzyl. The concentration of the anode mediator in the first electrolyte liquid 50 may be not less than 0.001 mol/L and not more than 2 mol/L.

In the lithium secondary battery 10 of the present embodiment, the first electrolyte liquid 50 may include at least one selected from the group consisting of cyclic ether, glyme, and sulfolane. The first electrolyte liquid 50 may be an ether solution. Examples of the ether include cyclic ether and glycol ether. The glycol ether may be a glyme represented by the composition formula $CH_3(OCH_2CH_2)_nOCH_3$. In the above composition formula, n is an integer of not less than 1. The first electrolyte liquid 50 may include, as a solvent, the cyclic ether or a mixture of the cyclic ether and the glyme.

According to the above configuration, an electrolyte liquid including an anode mediator can be realized as the first electrolyte liquid 50. In other words, since the solution including the anode mediator is an ether solution having no electronic conductivity, the ether solution itself can have a property as an electrolyte liquid.

Examples of the cyclic ether include tetrahydrofuran (THF), 2-methyltetrahydrofuran (2MeTHF), 1,3-dioxolane (1,3DO), and 4-methyl-1,3-dioxolane (4Me1,3DO).

Examples of the glyme include monoglyme (1,2-dimethoxyethane), diglyme (diethylene glycol dimethyl ether), triglyme (triethylene glycol dimethyl ether), tetraglyme (tetraethylene glycol dimethyl ether), pentaethylene glycol dimethyl ether, and polyethylene glycol dimethyl ether. The glyme may be a mixture of tetraglyme and pentaethylene glycol dimethyl ether.

Examples of the sulfolane include 3-methylsulfolane.

If lithium is dissolved in the ether solution of the condensed aromatic compound, the potential of the ether solution is varied slightly depending on the kind of solvent. Since cyclic ether has a low boiling point, cyclic ether is easily volatilized. Therefore, the cyclic ether and the glyme which has a relatively high boiling point may be mixed and used. If the cyclic ether is used as the solvent of the ether solution, and if THF or 2MeTHF is used as the cyclic ether, the potential of the ether solution tends to be further lowered. If the glyme is used as the solvent for the ether solution, and if triglyme is used as the glyme, the potential of the ether solution is most reduced. Therefore, a mixture of THF or 2MeTHF and the triglyme may be used as the solvent of the ether solution. The higher the glyme ratio in the solvent of the ether solution is, the higher the potential of the ether solution is. Therefore, the ratio between a volume of the cyclic ether and a volume of the glyme in the solvent of the first electrolyte liquid 50 may be 10:0 to 7:3.

During the charge, the anode mediator solvated on the anode current collector 31 is reduced, thereby a composite including solvated electrons and Li cations is formed. When this composite is brought into contact with the anode active material 32, the anode active material 32 receives the Li cations and the solvated electrons, and a compound of lithium and the anode active material 32 is formed. After the composite releases the Li cations and the solvated electrons, the solvated anode mediator is reduced again on the anode current collector 31. Due to this circulation, the anode active material 32 is reduced to a compound of lithium and the anode active material 32, and the solvated anode mediator in the first electrolyte liquid 50 is reduced. Thereby, the charge of the lithium secondary battery 10 is completed.

During the discharge, first, the reductant of the solvated anode mediator in the first electrolyte liquid 50 releases the solvated electrons and the Li cations on the anode current collector 31. The electrons are moved to the cathode 20 through an external circuit. The Li cations are moved to the cathode 20 through the separator 40. As the discharge progresses, the concentration of the anode mediator which has released the solvated electrons and the Li cations is increased in the first electrolyte liquid 50. Thereby, the potential of the first electrolyte liquid 50 is increased. When the potential of the first electrolyte liquid 50 exceeds the equilibrium potential of the compound of the lithium and the anode active material 32, the Li cations and the solvated electrons are supplied from the compound of the lithium and the anode active material 32 to the anode mediator, and the composite including the Li cations is formed again. The discharge of the lithium secondary battery 10 is maintained by the composite including the Li cation. When the Li cations and the solvated electrons are released from the compound of the lithium and the anode active material 32, and the composite including the Li cation in the first electrolyte liquid 50 releases the Li cations and the solvated electrons, the discharge of the lithium secondary battery 10 is completed.

It has long been known that an alkali metal such as lithium has a property of being dissolved in a specific solvent or solution. Examples of such solvents include an amine such as ammonia, methylamine, or ethylamine. In addition, an aromatic ketone such as acetophenone or butyrophenone and the solution thereof, and a certain aromatic ether solution also have the lithium metal solubility.

In these liquids, the lithium metal releases the electrons which have been owned by the lithium metal itself and is present on the 2S orbit in a form of solvating the electrons with the solvent, and the lithium metal is dissolved as lithium ions. The electrons solvated with the solvent are referred to as solvated electrons and behave like anions. A single solvent such as an amine, particularly ammonia, simply forms the solvated electrons with the solvent, however, an aromatic ketone solution or a certain aromatic ether solution forms a complicated configuration in which the solvated electrons are formed with a solution component. In order to dissolve lithium metal, all solution components are required.

These solvated electrons are present in the immediate vicinity of the lithium ions and interact with each other. If the interaction is strong, solution potential is low, and if the interaction is weak, the solution potential is high. The strength of the interaction is determined by the solution (solvent) species and their concentration, however, the solution (solvent) species are very dominant. In the case of the aromatic ketone solution, the interaction is weak, and in the case of the certain aromatic ether solution, the interaction is very strong. In addition, in the case of the amine, the interaction is intermediate.

The potential can be measured by placing the above-described solution between an electrode formed of a lithium metal and another electrode formed of a stable transition metal (Cu, Fe, or Ni) which does not react with a lithium metal.

Table 1 shows results of potential measurement provided by actually using copper foil and 2-methyltetrahydrofuran as the transition metal and the ether, respectively, and dissolving various materials in the ether.

TABLE 1

| Classification | Material name | Li metal solubility | Potential Vs. Li./Li$^+$ | Dissolution concentration (M) |
| --- | --- | --- | --- | --- |
| Aromatic | Phenanthrene | Available | 0.03 | 1 |
| Aromatic | Biphenyl | Available | 0 | 1 |
| Aromatic | trans-stilbene | Available | 0.3 | 0.5 |
| Aromatic | 2,2' bipyridyl | Available | 0.4 | 1 |
| Aromatic | 1,10-phenanthroline | Available | 1.78 | 1 |
| Aromatic | 4,4'-bipyridine | Available | 1.25 | 0.1 |
| Aromatic | 3,3'-bipyridine | None | 2.5 | 0.1 |
| Aromatic | 2,4'-bipyridine | Available | 0.54 | 0.1 |
| Aromatic | cis-stilbene | Available | 0.43 | 0.1 |
| Aromatic | 2,3'-bipyridine | Available | 0.58 | 0.1 |
| Ketone | Benzophenone | Available | 0.78 | 1 |
| Ketone | Acetophenone | Available | 1.81 | 0.1 |
| Ketone | Propiophenone | Available | 1.55 | 0.1 |
| Ketone | Butyrophenone | Available | 1.57 | 0.1 |
| Ketone | Valerophenone | Available | 1.82 | 0.1 |
| Amine | Ethylenediamine | Available | 1.71 | 0.1 |

While the aromatic compound species is unchanged in the aromatic ether solution having lithium metal solubility, if a carbonate such as vinylene carbonate, ethylene carbonate, propylene carbonate, butylene carbonate, fluoroethylene carbonate, dimethyl carbonate, methyl ethyl carbonate, or diethyl carbonate, or a lactone such as γ-butyrolactone is used in place of the ether, the lithium metal is not dissolved. Therefore, such a solution has no potential.

Similarly, while the aromatic compound species is unchanged, if methyl ethyl carbonate is used as the carbonate in place of the ether, the lithium metal solubility is provided, however, as shown in Table 2, the potential (vs. $Li/Li^+$) is a high potential of not less than 1V.

TABLE 2

| Material name | Solvent | Potential | Solution levels (M) |
|---|---|---|---|
| 4'-phenyl acetophenone (4-acetyl biphenyl) | Methylethyl Carbonate | 2 | 0.1 |
| 4'-phenyl butyrophenone (4-butyl biphenyl) | Methylethyl Carbonate | 1.7 | 0.1 |
| 4,4'-di-tert-butyl benzophenone | Methylethyl Carbonate | 1.4 | 0.1 |
| 2,4-dimethyl benzophenone | Methylethyl Carbonate | 1.3 | 0.1 |
| 3,4-dimethyl benzophenone | Methylethyl Carbonate | 1.4 | 0.1 |
| 4,4-dimethyl benzophenone | Methylethyl Carbonate | 1.4 | 0.1 |
| 2-methyl benzophenone | Methylethyl Carbonate | 1.4 | 0.1 |
| 3-methyl benzophenone | Methylethyl Carbonate | 1.5 | 0.1 |
| 4-methyl benzophenone | Methylethyl Carbonate | 1.4 | 0.1 |
| 4-phenyl benzophenone | Methylethyl Carbonate | 1.5 | 0.1 |
| 2-naphthyl phenyl ketone | Methylethyl Carbonate | 1.5 | 0.1 |
| 4,4'-dimethoxy benzyl (P-anisyl) | Methylethyl Carbonate | 2 | 0.1 |
| 4,4'-dimethyl benzyl | Methylethyl Carbonate | 2.1 | 0.1 |
| 2,4'-dimethoxy benzophenone | Methylethyl Carbonate | 1.5 | 0.1 |

If the potential of the lithium metal solution is low, especially if the potential of the lithium metal solution is sufficiently lower than the equilibrium potential of the anode active material, the anode active material can be lithiated, namely, the charge can be performed, by immersing the anode active material in the lithium metal solution.

However, since the equilibrium potential of the anode active material is varied depending on the anode active material species, it is necessary to select a suitable potential of the lithium metal solution according to the anode active material species. In other words, it is necessary to select the components of the aromatic ether solution according to the anode active material species.

Table 3 shows results provided by measuring, in the same manner as in Table 1, potential of 2-methyltetrahydrofuran solutions of various aromatic compounds in which a lithium metal has been dissolved.

TABLE 3

| Material name | Solvent | Potential vs Li/Li+ | Solution levels (M) |
|---|---|---|---|
| Phenanthrene | 2-methyl tetrahydrofuran | 0.03 | 1 |
| Biphenyl | 2-methyl tetrahydrofuran | 0 | 1 |
| Triphenylene | 2-methyl tetrahydrofuran | 0.01 | 0.1 |
| Acenaphthene | 2-methyl tetrahydrofuran | 0.02 | 0.1 |
| Acenaphthylene | 2-methyl tetrahydrofuran | 0.01 | 0.1 |

TABLE 3-continued

| Material name | Solvent | Potential vs Li/Li+ | Solution levels (M) |
|---|---|---|---|
| Fluoranthene | 2-methyl tetrahydrofuran | 0.01 | 0.1 |
| Benzyl | 2-methyl tetrahydrofuran | 0.16 | 0.1 |
| trans-stilbene | 2-methyl tetrahydrofuran | 0.3 | 0.5 |
| cis-stilbene | 2-methyl tetrahydrofuran | 0.43 | 0.1 |
| 2,2-bipyridyl | 2-methyl tetrahydrofuran | 0.4 | 1 |
| 2-methyl biphenyl | 2-methyl tetrahydrofuran | 0 | 0.1 |
| 3-methyl biphenyl | 2-methyl tetrahydrofuran | 0 | 0.1 |
| 4-methyl biphenyl | 2-methyl tetrahydrofuran | 0 | 0.1 |
| 3,3-dimethyl biphenyl | 2-methyl tetrahydrofuran | 0 | 0.1 |
| Biphenyl | Triglyme | 0.08 | 0.1 |
| Biphenyl | 2,5-dimethyl tetrahydrofuran | 0.18 | 0.1 |
| Biphenyl | Diethylene glycol dimethylether | 0.18 | 0.1 |
| Biphenyl | Dibutoxyethane | 0.05 | 0.1 |
| Biphenyl | Diglyme | 0.15 | 0.1 |
| Biphenyl | Tetraglyme | 0.18 | 0.1 |
| Biphenyl | 1,3-dioxolane | 0.55 | 0.1 |
| Benzophenone | Ethyl isopropyl sulfone | 1.55 | 0.1 |
| Triphenylamine | Tetraglyme | 1.5 | 0.1 |
| Biphenyl | 3-methyl sulfolane | 0.43 | 1 |

When electrolytic reduction is performed in these solutions, a lithium metal is produced, and at the same time of the production, the lithium is dissolved to produce a lithium metal solution.

By the way, as metals to be alloyed with lithium, there are bismuth, tin, germanium, aluminum, silicon, zinc, and cadmium, however, the equilibrium potentials when alloyed with lithium are different. Table 4 shows the equilibrium potential thereof.

TABLE 4

| Material name | Equilibrium potential (V vs. Li/Li+) |
|---|---|
| Bismuth | 1 |
| Tin | 0.6 |
| Germanium | 0.5 |
| Aluminum | 0.4 |
| Silicon | 0.3 |
| Zinc | 0.2 |
| Cadmium | 0.1 |

For example, in order to use an alloy metal having a low potential such as zinc or cadmium, a lithium metal solution having a potential of less than 0.1 V is required. Examples of such a lithium metal solution include a 2-methyltetrahydrofuran solution of phenanthrene, biphenyl, triphenyl, acenaphthene, acenaphthyl, or fluoranthene, a dibutoxyethane solution of biphenyl, and a triglyme solution of biphenyl.

In order to use aluminum or silicon, a lithium metal solution having a potential of less than 0.1 V is required. Examples of the lithium metal solution include a diglyme solution of biphenyl and a tetraglyme solution of biphenyl in addition to the above solution.

If the above-mentioned metal which is capable of alloying with lithium is immersed in the lithium metal solution, if the potential of the lithium metal solution is sufficiently lower than the equilibrium potential of the metal which is capable of alloying with the lithium, an alloying reaction of the lithium proceeds, and the lithium in the lithium metal solution is absorbed in the alloy metal.

Therefore, similarly to a case where a metal which is capable of alloying with lithium is present in the lithium metal solution produced by the electrolytic reduction, the alloying reaction of lithium proceeds, and the lithium in the lithium metal solution is absorbed in the alloy metal.

If the electrolytic reduction is continuously performed, the reaction in which the lithium metal solution is electrochemically generated by electrolytic reduction and the reaction in which the lithium in the lithium metal solution is chemically absorbed in the alloy metal reach an equilibrium, and the reaction proceeds at a constant potential of the lithium metal solution. Since lithiation of the alloy metal occurs chemically, the alloy metal only needs to be in contact with the lithium metal solution (namely, only needs to be immersed in the lithium metal solution). Unlike a conventional lithium alloy anode active material, the alloy metal does not have to be in contact with the electrode.

When the alloy metal absorbs lithium up to a saturation composition, the alloy metal is fully charged. If the charge (electrolytic reduction) is continued further, lithium is absorbed up to the saturation concentration of the lithium metal solution, however, when the saturation concentration is exceeded, the lithium metal is precipitated on the electrode, so the battery is fully charged at this time. The charge capacity of the anode is the sum of the charge capacity of the alloy metal and the charge capacity of the lithium metal solution, and the charge capacity is increased, as compared to a conventional battery using the alloy metal simply as the anode. However, the charge capacity of the alloy metal is overwhelmingly larger than the charge capacity of the lithium metal solution.

The potential of the lithium metal solution is determined on the basis of the Nernst equation from the activity of solvated electrons. Since the activity of the solvated electrons is decreased due to the discharge (electrolytic oxidation), the potential is shifted in a high direction. When the potential exceeds the equilibrium potential of the lithium alloy, the lithium metal solution is chemically reduced by the lithium alloy, the potential of the lithium metal solution is shifted in a low direction, and the lithium alloy is oxidized. By repeating this, lithium is released from the alloy metal, and the alloy metal is oxidized.

When the alloy metal completely releases lithium, the alloy metal is completely discharged. If the discharge (electrolytic oxidation) is continued further, the discharge continues until the lithium metal solution releases lithium completely. The discharge capacity of the anode is the sum of the discharge capacity of the alloy metal+the discharge capacity of the lithium metal solution, and the discharge capacity is increased, as compared to the conventional battery using the alloy metal as the anode. However, the discharge capacity of the alloy metal is overwhelmingly larger than the discharge capacity of the lithium metal solution.

As is clear from the above description, the lithium secondary battery of the present disclosure performs the charge/discharge of the alloy metal by interposing the lithium metal solution. Since the conventional lithium alloy anode active material is expanded during the charge and is contracted during the discharge, the discharge fails to be performed due to failure of the contact with the electrode (current collector) during the discharge. However, in the lithium secondary battery of the present disclosure, the charge/discharge can be performed due to the alloy metal even without the contact with the electrode (current collector). In other words, a decrease in current collection due to the volume expansion and contraction due to the charge and discharge, which is a defect of the alloy anode, can be suppressed.

Therefore, the lithium secondary battery of the present disclosure can be charged/discharged, even if the anode active material is pulverized, and reversibility which is not satisfactorily achieved with an alloy anode is realized.

Description of Charge/Discharge Process

The charge/discharge process of the lithium secondary battery 10 of the present embodiment will be described below.

Specifically, the charge/discharge process will be described with reference to an operation example having the following configuration.

In other words, in the present operation example, the anode current collector 31 is formed of stainless steel.

In the present operation example, the first electrolyte liquid 50 is an ether solution in which the anode mediator has been dissolved.

In the present operation example, the anode mediator is one kind of condensed aromatic compound (hereinafter, referred to as Md).

In the present operation example, the anode active material 32 is aluminum.

In the present operation example, the cathode 20 comprises the cathode current collector 21 formed of stainless steel and the cathode active material layer 22 including lithium iron phosphate ($LiFePO_4$) as a cathode active material.

Description of Charge Process

First, the charge reaction will be described.

The charge is performed by applying a voltage between the cathode current collector 21 and the anode current collector 31.

Reaction on Cathode

By applying the voltage, oxidation reaction of the cathode active material occurs on the cathode 20. In other words, lithium ions are released from the cathode active material. As a result, electrons are emitted from the cathode 20 to the outside of the lithium secondary battery 10.

For example, in the present operation example, the following reaction occurs.

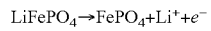

$$LiFePO_4 \rightarrow FePO_4 + Li^+ + e^-$$

A part of the generated lithium ions ($Li^+$) can be moved to the first electrolyte liquid 50 through the separator 40.

Reaction on Anode

By applying the voltage, electrons are supplied to the anode current collector 31 from the outside of the lithium secondary battery 10. As a result, a reduction reaction of the anode mediator occurs on the anode current collector 31.

For example, in the present operation example, the following reaction occurs.

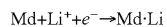

$$Md + Li^+ + e^- \rightarrow Md \cdot Li$$

The reduced anode mediator is oxidized by the anode active material 32. In other words, the anode active material 32 is reduced by the anode mediator. Thereby, the anode active material 32 reacts with lithium to become LiAl.

For example, in the present operation example, the following reaction occurs.

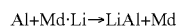

$$Al + Md \cdot Li \rightarrow LiAl + Md$$

As described above, the anode mediator does not change, if viewed in a total reaction.

On the other hand, the anode active material 32 located at a location away from the anode current collector 31 is in a charged state.

The above charge reaction can proceed, until either the anode active material 32 reaches the charged state or the cathode active material reaches the charged state.

Description of Discharge Process

Next, the discharge reaction from full charge will be described.

In the full charge, the anode active material 32 and the cathode active material are in a charged state.

In the discharge reaction, electric power is taken out between the cathode current collector 21 and the anode current collector 31.

Reaction on Cathode

During the discharge of the lithium secondary battery 10, electrons are supplied to the cathode 20 from the outside of the lithium secondary battery 10. Thereby, in the cathode 20, a reduction reaction of the cathode active material occurs.

For example, in the present operation example, the following reaction occurs.

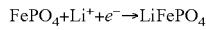
$FePO_4 + Li^+ + e^- \rightarrow LiFePO_4$

A part of the lithium ion ($Li^+$) can be supplied from the first electrolyte liquid 50 through the separator 40.

Reaction on Anode

During the discharge of the lithium secondary battery 10, the oxidation reaction of the anode mediator occurs on the anode current collector 31. Thereby, the electrons are emitted from the anode current collector 31 to the outside of the lithium secondary battery 10.

For example, in the present operation example, the following reaction occurs.

$Md \cdot Li \rightarrow Md + Li^+ + e^-$

The oxidized anode mediator is reduced by the anode active material 32. In other words, the anode active material 32 is oxidized by the anode mediator. Thereby, the anode active material 32 releases lithium.

For example, in the present operation example, the following reaction occurs.

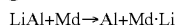
$LiAl + Md \rightarrow Al + Md \cdot Li$

As described above, the anode mediator does not change, if viewed in the total reaction.

On the other hand, the anode active material 32 located at a location away from the anode current collector 31 is in a discharged state.

The above discharge reaction can proceed, until either the anode active material 32 reaches the discharged state or the cathode active material reaches the discharged state.

EXAMPLES

The present disclosure will be described specifically on the basis of examples. However, the present disclosure is not limited at all by the following examples.

Measurement of Potential 1

Figure 2:
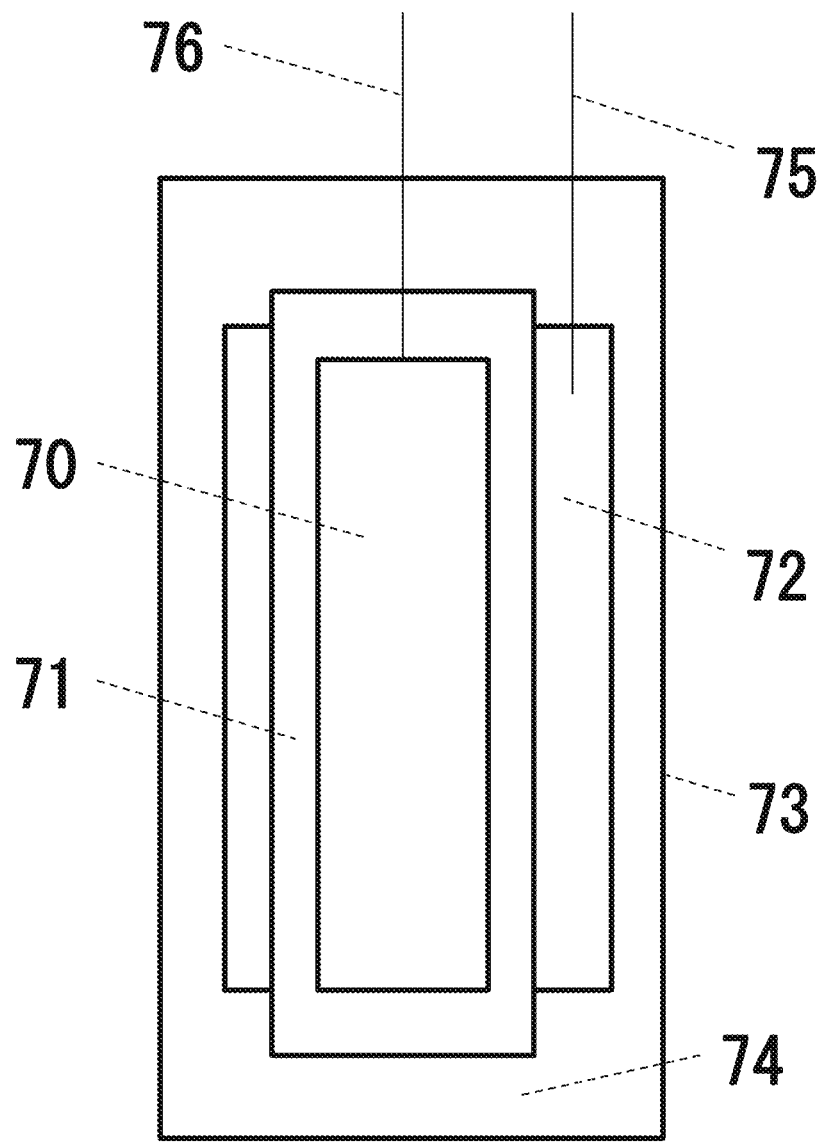
FIG. 2 is a schematic cross-sectional view of potential measurement cell according to the embodiment of the present disclosure.

The whole of 2×2 cm copper foil 70 wrapped with a polypropylene microporous separator 71 was wrapped with a large amount of lithium metal foil 72. Next, tabs 75 and 76 were attached to the copper foil 70 and the lithium metal foil 72, respectively. Subsequently, this was put in a laminate sheath 73, and an ether solution 74 in which biphenyl had been dissolved at 0.1 mol/L was injected, and then, an opening of the laminate sheath 73 was heat-sealed. In this way, a potential measurement cell shown in FIG. 2 was produced.

The solvent of the ether solution included 2-methyltetrahydrofuran as the cyclic ether and further included triglyme as glyme. The ratio of the volume of the triglyme to the volume of the solvent of the ether solution was 0.2. In other words, the ratio between the volume of 2-methyltetrahydrofuran and the volume of the triglyme was 8:2. In the ether solution, 1 mol/L of $LiPF_6$ was dissolved as a supporting salt. In this way, a potential measurement cell 1 was produced.

Figure 3:
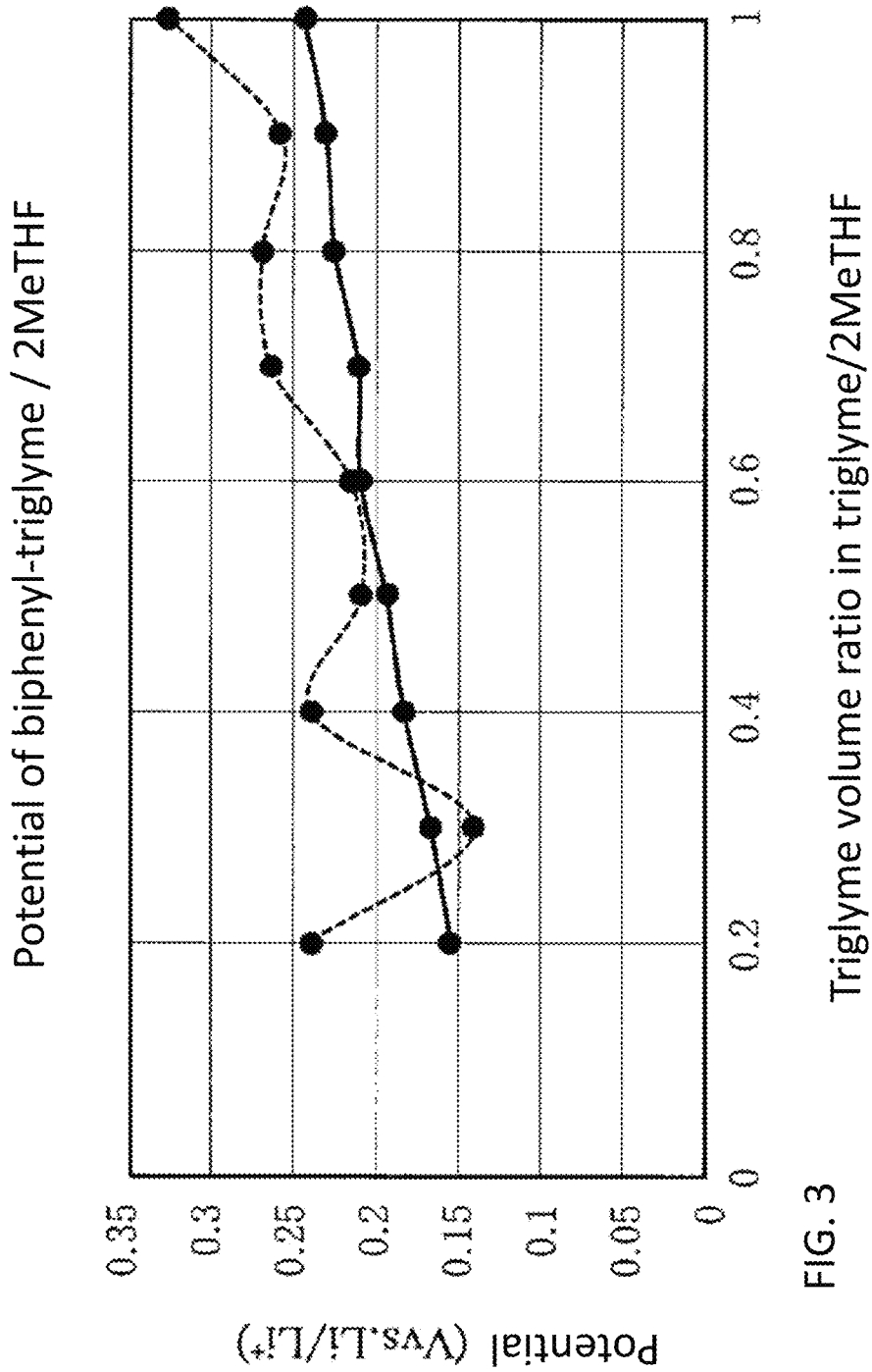
FIG. 3 is a graph showing a relationship between a ratio of a volume of the triglyme to a volume of a solvent of an electrolyte liquid and a value of potential of the potential measurement cell in the potential measurement cells 1 to 9.

FIG. 3 shows the potential (V vs. $Li/Li^+$) measured on the basis of the lithium metal using this potential measurement cell. The value of the potential immediately after the potential measurement cell was produced was approximately 0.24 V vs. $Li/Li^+$. The potential value after 100 hours from the production of the potential measurement cell was approximately 0.15 V vs. $Li/Li^+$.

Next, potential measurement cells 2 to 9 were produced by the same method as described above, except that the ratio of the volume of the triglyme to the volume of the solvent of the ether solution was changed. In the potential measurement cells 2 to 9, the ratio of the volume of the triglyme to the volume of the solvent of the ether solution was 0.3, 0.4, 0.5, 0.6, 0.7, 0.8, 0.9, and 1.0, respectively. With respect to these potential measurement cells, the values of the potential immediately after the potential measurement cells were produced and the values of the potential after 100 hours from the production of the potential measurement cells were measured. FIG. 3 shows a relationship between the ratios of the volumes of the triglyme to the volumes of the solvents of the ether solutions and the values of the potential of the potential measurement cells. In FIG. 3, the broken line indicates the values of the potential immediately after the potential measurement cells were produced. The solid line indicates the value of the potential after 100 hours from the production of the potential measurement cells.

Next, aluminum was added to each ether solution of the potential measurement cells 1 to 9. The surface of the aluminum was observed 100 hours after the aluminum was added. As a result, it was observed that the aluminum added to the potential measurement cell 1 in which the ratio of the volume of 2-methyltetrahydrofuran and the volume of the triglyme was 8:2 and the aluminum added to the potential measurement cell 2 in which the ratio of the volume of 2-methyltetrahydrofuran and the volume of the triglyme was 7:3 were turned into a powdered LiAl alloy. It was observed that the aluminum added to the potential measurement cell 3 in which the ratio of the volume of 2-methyltetrahydrofuran and the volume of the triglyme was 6:4 was rough only on the surface thereof and that the part thereof was turned into a LiAl alloy. The shape of this aluminum when the aluminum was added to the ether solution was maintained. No changes of the aluminum added to the potential measurement cells 4 to 9 in which the ratio between the volume of 2-methyltetrahydrofuran and the volume of the triglyme was 5:5 to 0:10 were observed and no LiAl alloy was formed. From the above results, it can be seen that, if the potential of the ether solution was not more than 0.18 V vs.

Li/Li$^+$, a LiAl alloy is formed. Such an ether solution can be used as a solvent for the first electrolyte liquid of the lithium secondary battery.

Measurement of Charge/Discharge Characteristic

In order to measure the charge/discharge characteristic, a battery 10-1 was prepared. In the battery 10-1, a stainless steel foil was used as a working electrode current collector (anode current collector). Li$_7$La$_3$Zr$_2$O$_{12}$ (LLZ) was used as a separator. As the electrolyte liquid of the working electrode (anode electrolyte liquid), an ether solution in which 0.1 mol/L of lithium biphenyl in which Li had been dissolved in advance and 1 mol/L of LiPF$_6$ had been dissolved was used. The solvent of the ether solution included 2-methyltetrahydrofuran and triglyme. In the solvent of the ether solution, the ratio between the volume of 2-methyltetrahydrofuran and the volume of the triglyme was 7:3. In the battery 10-1, a Li metal was used as a counter electrode (cathode). A triglyme solution in which 1 mol/L of LiPF$_6$ had been dissolved was used as the electrolyte liquid of the counter electrode (cathode electrolyte liquid). The charge/discharge was performed using this battery 10-1. Further, aluminum attached thereto. A triglyme solution 74 in which biphenyl had been dissolved at 0.00625 mol/L was injected, and then, the laminate sheath 73 was heat-sealed. In the triglyme solution, 1 mol/L of LiPF$_6$ had been dissolved as a supporting salt. The potential measurement cell 11 was produced as described above. Table 2 shows potential (V vs. Li/Li$^+$) measured on the basis of the lithium metal using this potential measurement cell 11. The value of the potential immediately after the potential measurement cell was produced was 2.016 V vs. Li/Li$^+$. The value of the potential after 100 hours from the production of the potential measurement cell was 0.28 V vs. Li/Li$^+$.

Next, potential measurement cells 12 to 17 were produced by the same method as described above, except that the concentration of biphenyl in the triglyme solution was changed. With regard to these potential measurement cells, the values of the potential immediately after the potential measurement cells were produced, the values of the potential after 20 hours from the production of the potential measurement cells were produced, and the values of the potential after 100 hours from the production of the potential measurement cells were produced were measured. Table 5 shows the measurement results.

TABLE 5

Figure 4A:
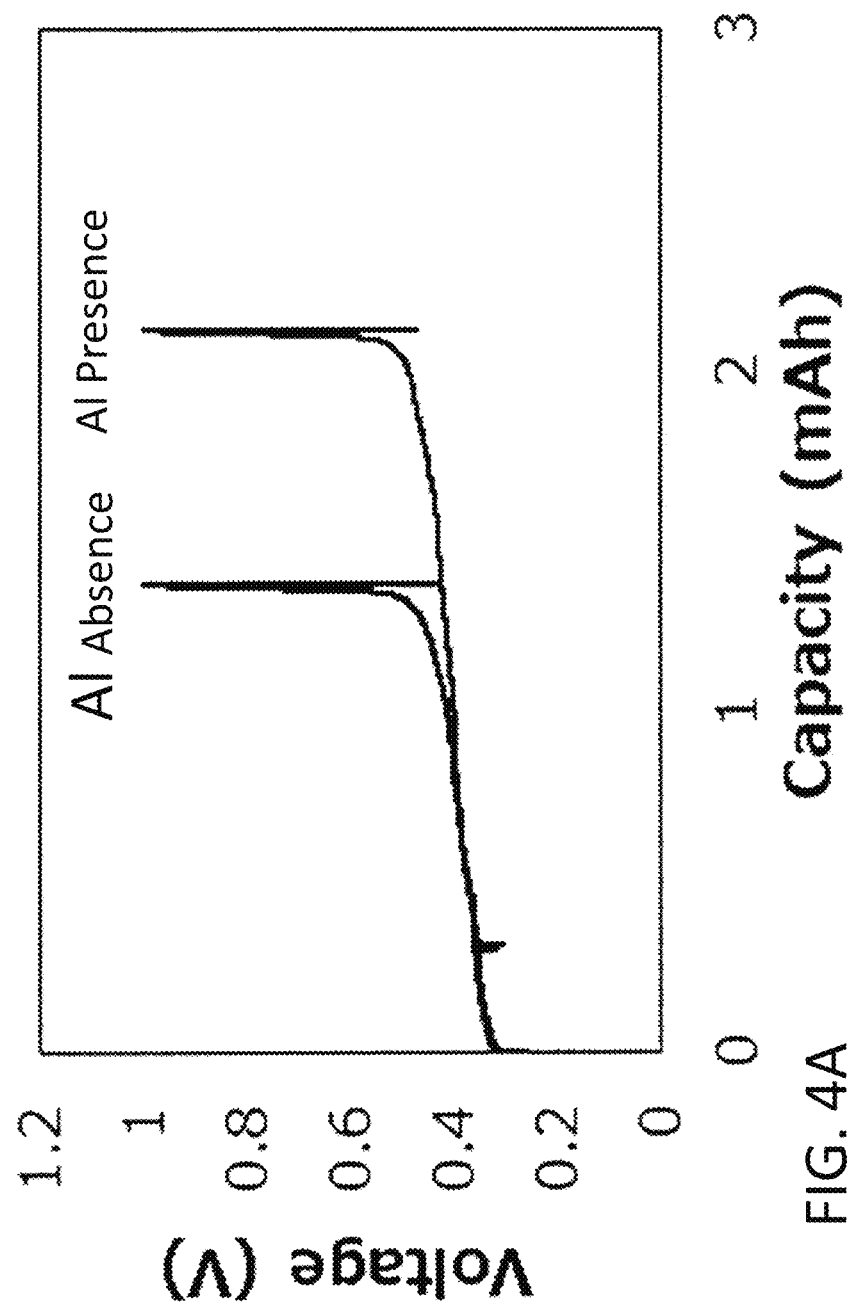
FIG. 4A is a graph showing a charge/discharge characteristic of a battery 10.

| | Battery 11 | Battery 12 | Battery 13 | Battery 14 | Battery 15 | Battery 16 | Battery 17 |
|---|---|---|---|---|---|---|---|
| Biphenyl concentration (mol/L) | 0.00625 | 0.0125 | 0.025 | 0.05 | 0.1 | 0.5 | 1 |
| OCV(V vs. Li/Li$^+$) 0 hours later | 2.016 | 1.735 | 1.108 | 0.39 | 0.34 | 0.27 | 0.25 |
| OCV(V vs. Li/Li$^+$ 20 hours later) | 0.319 | 0.298 | 0.255 | 0.246 | 0.231 | 0.242 | 0.241 |
| OCV(V vs. Li/Li$^+$ 100 hours later) | 0.28 | 0.262 | 0.25 | 0.246 | 0.238 | 0.239 | 0.245 | having an amount which increased the capacity of the battery 10-1 by 0.8 mAh was added to the electrolyte liquid of the working electrode of the battery 10-1, and the charge/discharge was performed. In this way, the charge/discharge characteristic of the battery 10-1 was measured. FIG. 4A is a graph showing the charge/discharge characteristic of the battery 10-1. As can be seen from FIG. 4A, the capacity of the battery 10-1 increased by 0.8 mAh by the addition of aluminum. Thus, it can be seen that the capacity of the battery 10-1 is increased by using the added aluminum for the charge and discharge.

Figure 4B:
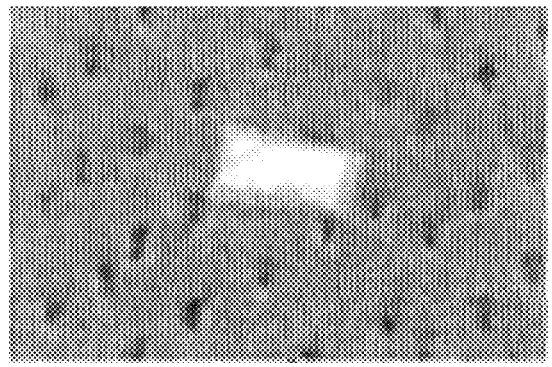
FIG. 4B is an image of aluminum before the aluminum is added to the battery 10.
Figure 4C:
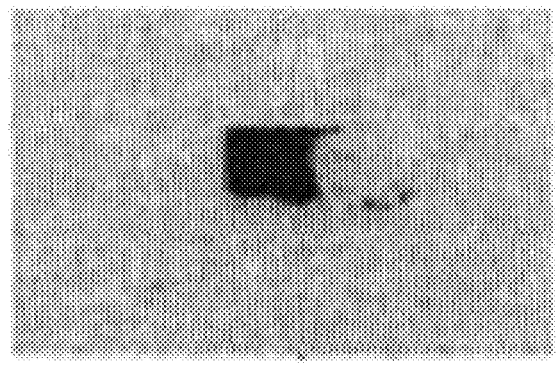
FIG. 4C is an image of the aluminum after the aluminum is added to the battery 10.

FIG. 4B is an image of the aluminum before the aluminum was added to the battery 10-1. FIG. 4C is an image of the aluminum after the aluminum was added to the battery 10-1. As can be seen from FIG. 4B and FIG. 4C, it was observed that the color of the aluminum immersed in the electrolyte liquid of the working electrode was changed to be black, and that the LiAl alloy was formed.

The same measurement was performed on other anode active materials described in the embodiment, and the present inventors confirmed that a compound (alloy or C$_6$Li) of lithium and the anode active material was formed.

Measurement of Potential 2

The whole of 2×2 cm copper foil 70 wrapped with a polypropylene microporous separator 71 was wrapped with a large amount of lithium metal foil 72. Next, tabs 75 and 76 were attached to the copper foil 70 and the lithium metal foil 72, respectively. Subsequently, a laminate sheath 73 was Next, tin was added to each triglyme solution of the potential measurement cells 11 to 17. The tin surface was observed after 100 hours from the addition of the tin. As a result, it was observed that the tin was turned into a LiSn alloy in the potential measurement cells 13 to 17. From the above results, it can be seen that, if the potential of the triglyme solution is 0.25 V vs. Li/Li$^+$, a LiSn alloy is formed. Such a triglyme solution can be used as the solvent for the first electrolyte liquid of the lithium secondary battery.

Measurement of Potential 3

The whole of 2×2 cm copper foil 70 wrapped with a polypropylene microporous separator was wrapped with a large amount of lithium metal foil 72. Next, tabs 75 and 76 were attached to the copper foil 70 and the lithium metal foil 72, respectively. Subsequently, a laminate sheath 73 was attached thereto. An ether solution 74 in which biphenyl had been dissolved at 0.1 mol/L was injected, and then, the laminate sheath 73 was heat-sealed. As the solvent of the ether solution, 2-methyltetrahydrofuran was used as a cyclic ether, and 1 mol/L of LiPF$_6$ was dissolved as a supporting salt. In this way, a potential measurement cell 18 was produced. The value of the potential immediately after the potential measurement cell 18 was produced was approximately 0.06 V vs. Li/Li$^+$. The value of the potential after 100 hours from the production of the potential measurement cell 18 was approximately 0 V vs. Li/Li$^+$.

Measurement of Charge/Discharge Characteristic

Figure 5:
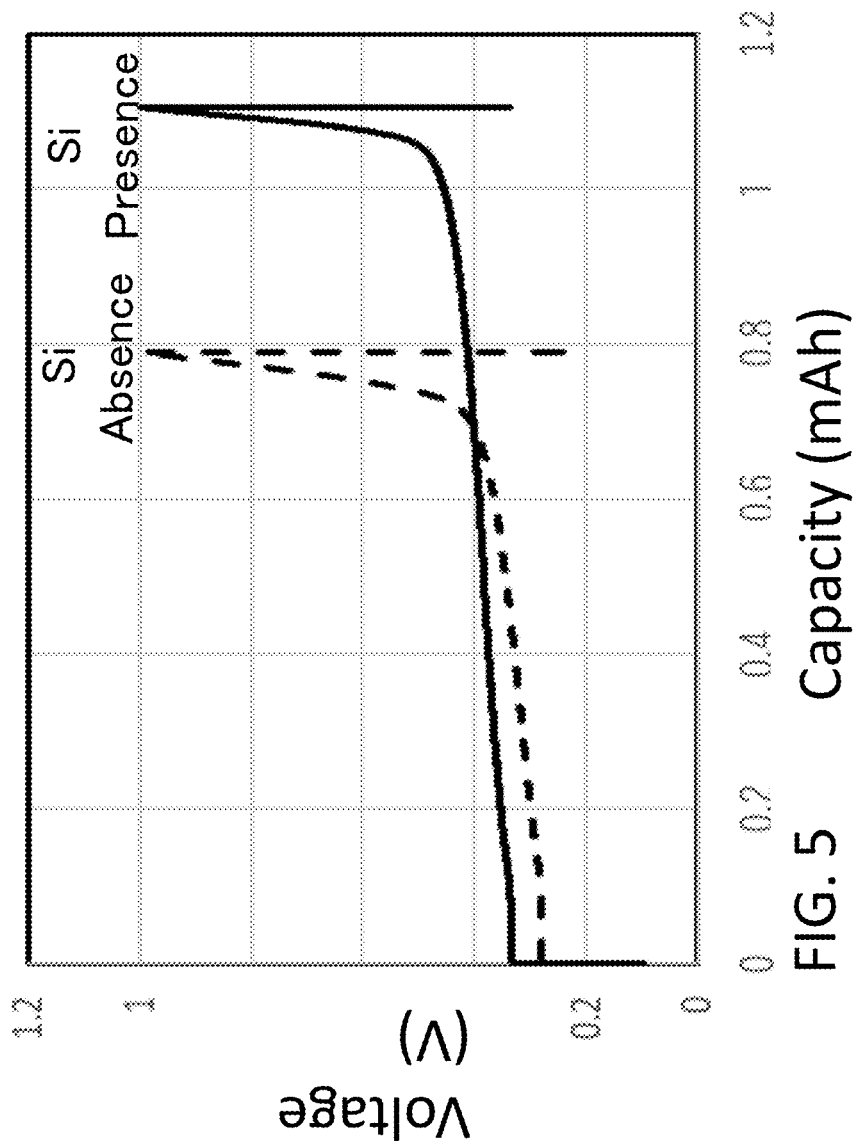
FIG. 5 is a graph showing a charge/discharge characteristic of a battery 18.

In order to measure the charge/discharge characteristic, a battery 10-2 was prepared. In the battery 10-2, a stainless steel foil was used as a current collector of the working electrode (anode current collector). $Li_7La_3Zr_2O_{12}$ (LLZ) was used as a separator. As the electrolyte liquid of the working electrode (anode electrolyte liquid), an ether solution in which 0.1 mol/L of lithium biphenyl in which Li had been dissolved in advance and 1 mol/L of $LiPF_6$ had been dissolved was used. The solvent of the ether solution included 2-methyltetrahydrofuran. In the battery 10-2, a Li metal was used as a counter electrode (cathode). A 2-methyltetrahydrofuran solution in which 1 mol/L of $LiPF_6$ had been dissolved was used as the electrolyte liquid of the counter electrode (cathode electrolyte liquid). The charge/discharge was performed using this battery 10-2. Further, Si was added to the electrolyte liquid of the working electrode of the battery 10-2, and the charge/discharge was performed. Thereby, the charge/discharge characteristic of the battery 10-2 was measured. FIG. 5 is a graph showing the charge/discharge characteristic of the battery 10-2. As can be seen from FIG. 5, the capacity of the battery 10-2 was increased by 0.3 mAh by the addition of the silicon. Thus, it can be seen that the capacity of the battery 10-2 has increased by using the added silicon for the charge and the discharge.

Comparative Example 1

A dissolution test of lithium metal in biphenyl-carbonate and a γBL solution was performed.

Various carbonate solutions in which biphenyl had been dissolved at 0.1 mol/L, specifically, a dimethyl carbonate solution, a diethyl carbonate solution, a methyl ethyl carbonate solution, a propylene carbonate solution, an ethylene carbonate solution, and a γBL solution in which biphenyl had been dissolved at 0.1 mol/L were prepared. A lithium metal was added to each of these solutions, and the solutions were observed. If the lithium metal is dissolved, solvated electrons are generated, and the solution color should change accordingly. However, the solution remained colorless and transparent, and the lithium metal was not dissolve. Since the lithium metal solution failed to be produced, it was impossible to measure its potential.

Comparative Example 2

In the same configuration as the measurement of the charge/discharge characteristic of the inventive example, the same test was performed, using a dimethyl carbonate solution in which 0.1 mol/L of lithium biphenyl and 1 mol/L of $LiPF_6$ had been dissolved and a γBL solution in which 0.1 mol/L of lithium biphenyl and 1 mol/L of $LiPF_6$ had been dissolved in place of the ether solution in which 0.1 mol/L of lithium biphenyl and 1 mol/L of $LiPF_6$ had been dissolved. However, the anode potential immediately became 0V at the time of the charge, and the charge failed completely. This is probably because a lithium metal is not dissolved in these solutions, and thus, a lithium metal solution is not generated electrochemically.

Comparative Example 3

The whole of 2×2 cm copper foil wrapped with a polypropylene microporous separator was wrapped in a large amount of lithium metal foil and used as a counter electrode. Next, using copper foil on which aluminum foil was put as the working electrode, these electrode groups were inserted into the laminate sheath, an ether solution in which biphenyl was dissolved at 0.1 mol/L was injected, and the laminate sheath was heat-sealed. A test in which the cell was charged until the voltage reached 0 and the cell was discharged to 1V was performed. Although the charge was possible, at the time of the discharge, the voltage immediately reached 1V and the discharge failed completely. After the completion of the test, the cell was disassembled and the anode was observed. Almost no aluminum remained on the copper foil, and a large amount of black powder which seemed to be a lithium aluminum alloy adhered to the separator. When aluminum is turned into a lithium aluminum alloy by the charge, the volume thereof is expanded approximately twice. It is conceivable that, when the volume was expanded to this point, since the failure of the contact with the current collector occurred, the discharge failed. Thus, if the alloy metal was used as it was, reversibility was hardly observed.

INDUSTRIAL APPLICABILITY

The lithium secondary battery of the present disclosure can be suitably used as, for example, an electricity storage device or an electricity storage system.

REFERENCE SIGNS LIST

10 Lithium secondary battery
20 Cathode
21 Cathode current collector
22 Cathode active material layer
30 Anode
31 Anode current collector
32 Anode active material
40 Separator
50 First electrolyte liquid
52 Second electrolyte liquid
60 Container
60a Region
60b Region

The invention claimed is:
1. A lithium secondary battery, comprising:
a cathode;
an anode including an anode current collector and an anode active material;
a separator disposed between the cathode and the anode; and
an electrolyte liquid in contact with the cathode and the anode,
wherein:
the cathode includes a cathode current collector and a cathode active material layer disposed on the cathode current collector,
the anode includes a material capable of forming an alloy with lithium during charge,
the electrolyte liquid includes lithium ions and counter anions of the lithium ions,
the electrolyte liquid contains at least one selected from the group consisting of phenanthrene, biphenyl, triphenylene, acenaphthene, acenaphthylene, fluoranthene, and benzyl,
the electrolyte includes at least one selected from the group consisting of a cyclic ether, a glyme, and a sulfolane as the solvent thereof,
the anode active material is disposed away from the anode current collector,
the anode active material as a whole is separated from the anode current collector by the electrolyte liquid,
in a charge state, a potential of the electrolyte liquid is lower than an equilibrium potential of the anode active material, and in a discharge state, the potential of the electrolyte liquid is higher than the equilibrium potential of the alloy of the anode active material with lithium.

2. The lithium secondary battery according to claim 1, wherein
the cyclic ether includes at least one selected from the group consisting of 2-methyltetrahydrofuran, tetrahydrofuran, 1,3-dioxolane, and 4-methyl-1,3-dioxolane.

3. The lithium secondary battery according to claim 1, wherein
the glyme includes at least one selected from the group consisting of monoglyme, diglyme, triglyme, tetraglyme, and polyethylene glycol dimethyl ether.

4. The lithium secondary battery according to claim 1, wherein
the sulfolane includes 3-methylsulfolane.

5. The lithium secondary battery according to claim 1, wherein
the anode active material includes Al,
a LiAl alloy is generated during the charge, and
a composition of the LiAl alloy is at least one selected from the group consisting of LiAl, $Li_2Al_3$, and $Li_4Al_5$.

6. The lithium secondary battery according to claim 1, wherein
the anode active material includes Zn,
a LiZn alloy is generated during the charge, and
a composition of the LiZn alloy is at least one selected from the group consisting of $Li_2Zn_3$, $LiZn_2$, $Li_2Zn_5$, $LiZn_4$, and LiZn.

7. The lithium secondary battery according to claim 1, wherein
the anode active material includes Si,
a LiSi alloy is generated during the charge, and
a composition of the LiSi alloy is at least one selected from the group consisting of $Li_{22}Si_5$, $Li_{13}Si_4$, $Li_2Si_3$ and $Li_{12}Si_7$.

8. The lithium secondary battery according to claim 1, wherein
the anode active material includes Sn,
a LiSn alloy is generated during the charge, and
a composition of the LiSn alloy is at least one selected from the group consisting of $Li_{22}Sn_5$, $Li_2Sn_2$, $Li_{13}Sn_5$, $Li_2Sn_3$, $Li_5Sn_2$, LiSn, and $Li_2Sn_5$.

9. The lithium secondary battery according to claim 1, wherein
the anode active material includes Ge,
a LiGe alloy is generated during the charge, and
a composition of the LiGe alloy is at least one selected from the group consisting of $Li_5Ge_{22}$ and $Li_3Ge$.

10. The lithium secondary battery according to claim 1, wherein
the anode active material includes Cd,
a LiCd alloy is generated during the charge, and
a composition of the LiCd alloy is at least one selected from the group consisting of $LiCd_3$ and $Li_3Cd$.

11. The lithium secondary battery according to claim 1, wherein
the anode active material includes Bi,
a LiBi alloy is generated during the charge, and
a composition of the LiBi alloy is at least one selected from the group consisting of LiBi and $Li_3Bi$.

12. The lithium secondary battery according to claim 1, wherein
the separator includes at least one selected from the group consisting of a solid electrolyte, a gel electrolyte, an ion exchange resin membrane, a semipermeable membrane, and a porous membrane.

13. The lithium secondary battery according to claim 1, wherein
the electrolyte liquid contains at least one selected from the group consisting of phenanthrene, triphenylene, acenaphthene, acenaphthylene, fluoranthene, and benzyl.

14. The lithium secondary battery according to claim 1, wherein
the anode active material is solidified with a binder including polyvinylidene fluoride, polypropylene, polyethylene, or polyimide.

15. The lithium secondary battery according to claim 1, wherein
the anode current collector is disposed between the separator and the anode active material.

* * * * *